US012719570B2

(12) United States Patent
Kurosawa

(10) Patent No.: US 12,719,570 B2
(45) Date of Patent: Aug. 25, 2026

(54) OPTICAL TRANSMISSION LINE MONITORING DEVICE, OPTICAL TRANSMISSION LINE MONITORING METHOD, AND RECORDING MEDIUM STORING OPTICAL TRANSMISSION LINE MONITORING PROGRAM

(71) Applicant: NEC Corporation, Tokyo (JP)

(72) Inventor: Naofumi Kurosawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 233 days.

(21) Appl. No.: 18/752,985

(22) Filed: Jun. 25, 2024

(65) Prior Publication Data

US 2025/0015885 A1 Jan. 9, 2025

(30) Foreign Application Priority Data

Jul. 3, 2023 (JP) ................................ 2023-109038

(51) Int. Cl.
*H04B 10/073* (2013.01)
*H04B 10/077* (2013.01)

(52) U.S. Cl.
CPC ..... *H04B 10/0731* (2013.01); *H04B 10/0777* (2013.01); *H04B 10/0779* (2013.01)

(58) Field of Classification Search
None
See application file for complete search history.

(56) References Cited

U.S. PATENT DOCUMENTS 5,510,925 A * 4/1996 Suzuki ................. H04B 10/291 398/180
2002/0126952 A1* 9/2002 Shirai ................ H04B 10/2972 385/24
2021/0021336 A1* 1/2021 Wang ................ H01S 3/094015

FOREIGN PATENT DOCUMENTS

JP H08-265261 A 10/1996

* cited by examiner

*Primary Examiner* — Casey L Kretzer
(74) *Attorney, Agent, or Firm* — Sughrue Mion, PLLC

(57) ABSTRACT

An optical transmission line monitoring device is one of two facing optical transmission line monitoring devices connected by an optical transmission line via a relay, and includes a transmission unit that transmits an own-device monitoring signal to the optical transmission line, a reception unit that receives a monitoring signal, a mixture of a turnback monitoring signal, which is the own-device monitoring signal turned back, and an other-device monitoring signal, having a pulse width and amplitude different from the own-device monitoring signal and transmitted from the facing optical transmission line monitoring device, an identification unit that identifies the turnback and other-device monitoring signals in the monitoring signal, using identification criteria for identifying the turnback and other-device monitoring signals from the monitoring signal, and an output unit that outputs an identification result for the turnback and other-device monitoring signals. Therefore, the optical transmission line is reliably monitored using opposing bidirectional monitoring signals.

20 Claims, 10 Drawing Sheets

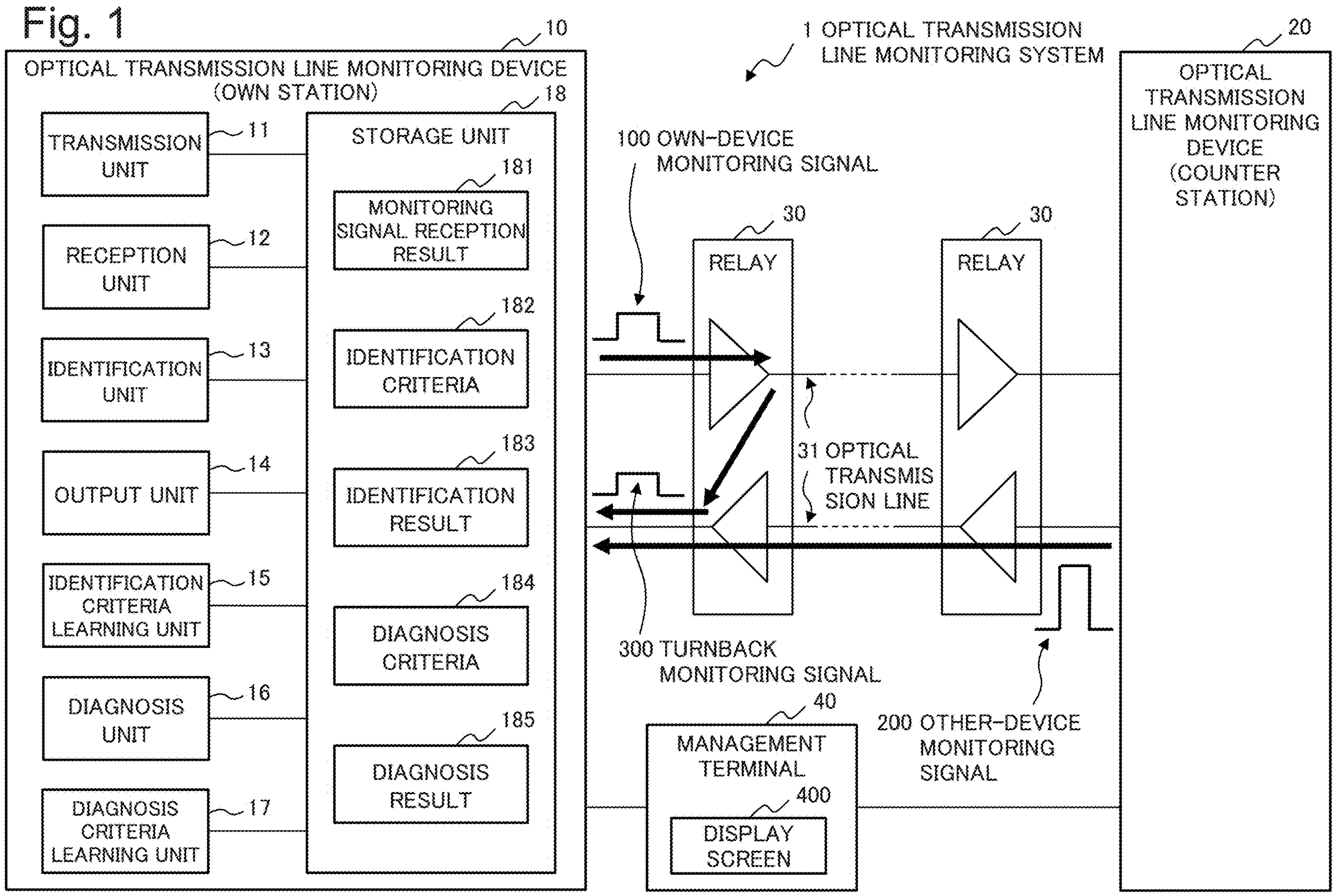
Fig. 1
10
OPTICAL TRANSMISSION LINE MONITORING DEVICE (OWN STATION)
18
STORAGE UNIT
TRANSMISSION UNIT
11
RECEPTION UNIT
12
IDENTIFICATION UNIT
13
OUTPUT UNIT
14
IDENTIFICATION CRITERIA LEARNING UNIT
15
DIAGNOSIS UNIT
16
DIAGNOSIS CRITERIA LEARNING UNIT
17
181
MONITORING SIGNAL RECEPTION RESULT
182
IDENTIFICATION CRITERIA
183
IDENTIFICATION RESULT
184
DIAGNOSIS CRITERIA
185
DIAGNOSIS RESULT
1 OPTICAL TRANSMISSION LINE MONITORING SYSTEM
100 OWN-DEVICE MONITORING SIGNAL
30
RELAY
30
RELAY
31 OPTICAL TRANSMIS SION LINE
300 TURNBACK MONITORING SIGNAL
40
MANAGEMENT TERMINAL
400
DISPLAY SCREEN
200 OTHER-DEVICE MONITORING SIGNAL
20
OPTICAL TRANSMISSION LINE MONITORING DEVICE (COUNTER STATION)

AMPLITUDE OF RECEIVED MONITORING SIGNAL
TIME
Tp
Xp
Tr
Xr
Tl
Xl
• PULSE WIDTH OF OWN-DEVICE MONITORING SIGNAL 100 / TURNBACK MONITORING SIGNAL 300: Ta
• PULSE WIDTH OF OTHER-DEVICE MONITORING SIGNAL 200: Tb

Fig. 3A

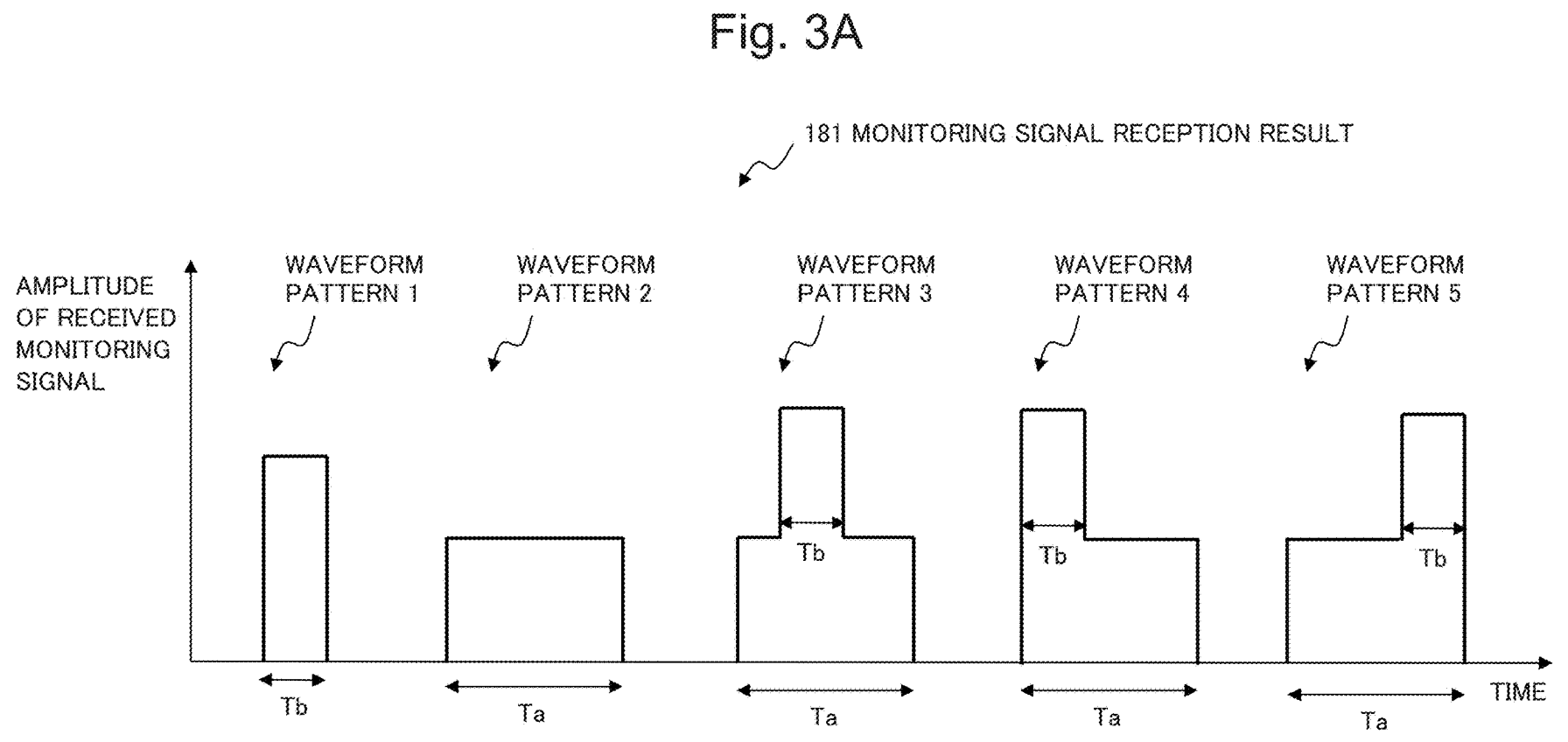

181 MONITORING SIGNAL RECEPTION RESULT

WAVEFORM PATTERN 1

WAVEFORM PATTERN 2

WAVEFORM PATTERN 3

WAVEFORM PATTERN 4

WAVEFORM PATTERN 5

Tb

Ta

TIME

AMPLITUDE OF RECEIVED MONITORING SIGNAL

Fig. 3B

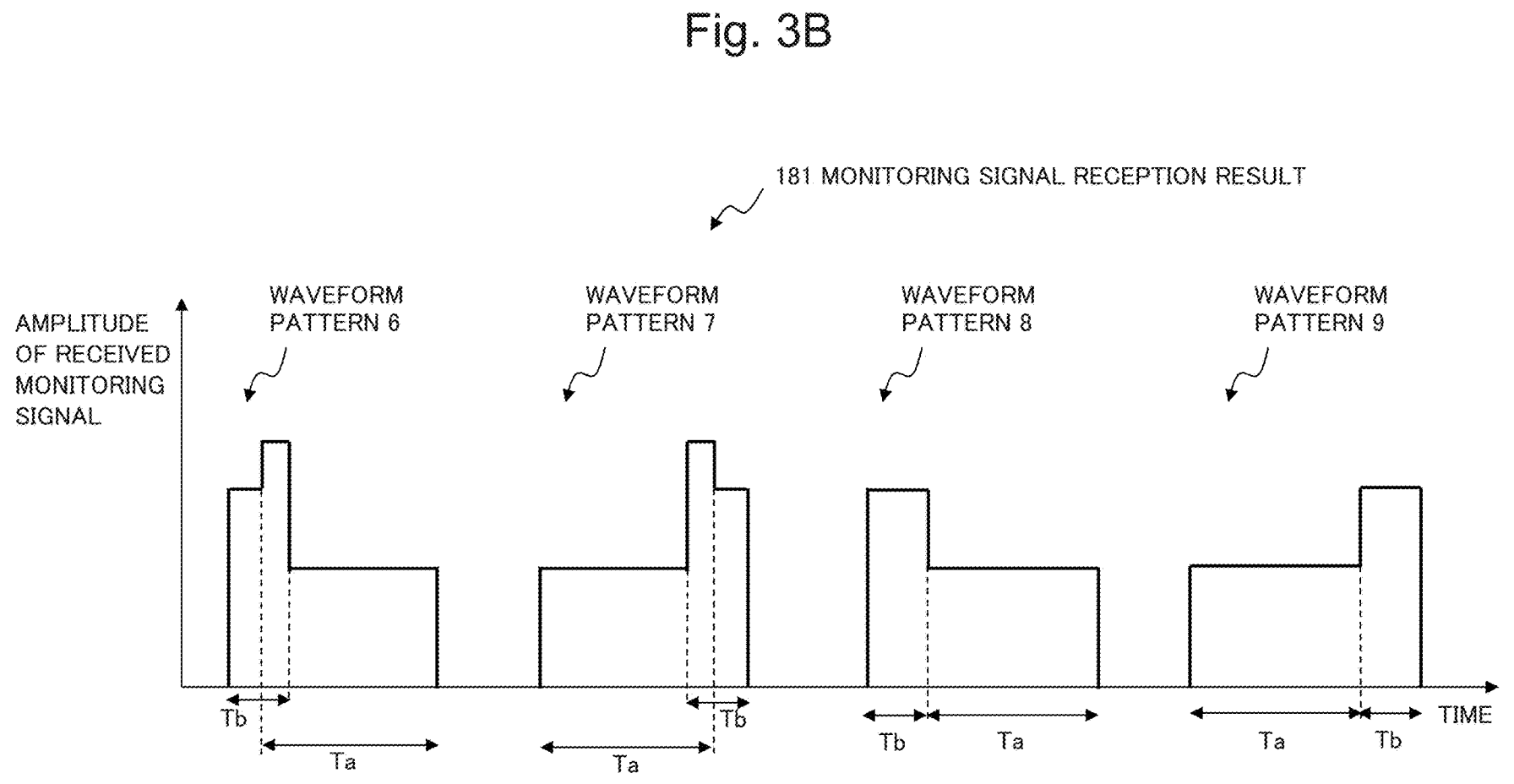

181 MONITORING SIGNAL RECEPTION RESULT

WAVEFORM PATTERN 6

WAVEFORM PATTERN 7

WAVEFORM PATTERN 8

WAVEFORM PATTERN 9

Ta

Tb

TIME

AMPLITUDE OF RECEIVED MONITORING SIGNAL

Fig. 4

182 IDENTIFICATION CRITERIA

| WAVEFORM | WAVEFORM CHARACTERISTICS | MONITORING SIGNAL IDENTIFICATION METHOD |
|---|---|---|
| PATTERN 1 | PULSE WIDTH: Tb | ONLY OTHER-DEVICE MONITORING SIGNAL 200 |
| PATTERN 2 | PULSE WIDTH: Ta, NO AMPLITUDE STEPS | ONLY TURNBACK MONITORING SIGNAL 300 |
| PATTERN 3 | PULSE WIDTH: Ta, $Xl = Xr$ | OTHER-DEVICE MONITORING SIGNAL 200 COMPLETELY OVERLAPS IN SUCH WAY AS TO INCLUDE TURNBACK MONITORING SIGNAL 300<br>AMPLITUDE OF OTHER-DEVICE MONITORING SIGNAL 200 PART = $Xp - \max(Xl, Xr)$<br>AMPLITUDE OF TURNBACK MONITORING SIGNAL 300 PART = $\max(Xl, Xr)$ |
| PATTERN 4 | PULSE WIDTH: Ta, $Tl = 0$ | |
| PATTERN 5 | PULSE WIDTH: Ta, $Tr = 0$ | |
| PATTERN 6 | PULSE WIDTH: LONGER THAN Ta, $Xl \neq 0$, $Xr \neq 0$, $Xl > Xr$ | PORTION OF OTHER-DEVICE MONITORING SIGNAL 200 OVERLAPS TURNBACK MONITORING SIGNAL 300<br>AMPLITUDE OF OTHER-DEVICE MONITORING SIGNAL 200 PART = $\max(Xl, Xr)$<br>AMPLITUDE OF TURNBACK MONITORING SIGNAL 300 PART = $\min(Xl, Xr)$ |
| PATTERN 7 | PULSE WIDTH: LONGER THAN Ta, $Xl \neq 0$, $Xr \neq 0$, $Xl < Xr$ | |
| PATTERN 8 | PULSE WIDTH: LONGER THAN Ta, $Tl = 0$ | OTHER-DEVICE MONITORING SIGNAL 200 AND TURNBACK MONITORING SIGNAL 300 ARE IN CONTACT WITHOUT OVERLAPPING<br>AMPLITUDE OF OTHER-DEVICE MONITORING SIGNAL 200 PART = $\max((Xl \text{ or } Xr), Xp)$<br>AMPLITUDE OF TURNBACK MONITORING SIGNAL 300 PART = $\min((Xl \text{ or } Xr), Xp)$ |
| PATTERN 9 | PULSE WIDTH: LONGER THAN Ta, $Tr = 0$ | |

AMPLITUDE OF RECEIVED MONITORING SIGNAL
WAVEFORM PATTERN 6
181 MONITORING SIGNAL RECEPTION RESULT
TIME
400 DISPLAY SCREEN
OTHER-DEVICE MONITORING SIGNAL RECEPTION STATUS
AMPLITUDE
TIME
TURNBACK MONITORING SIGNAL RECEPTION STATUS
AMPLITUDE
TIME

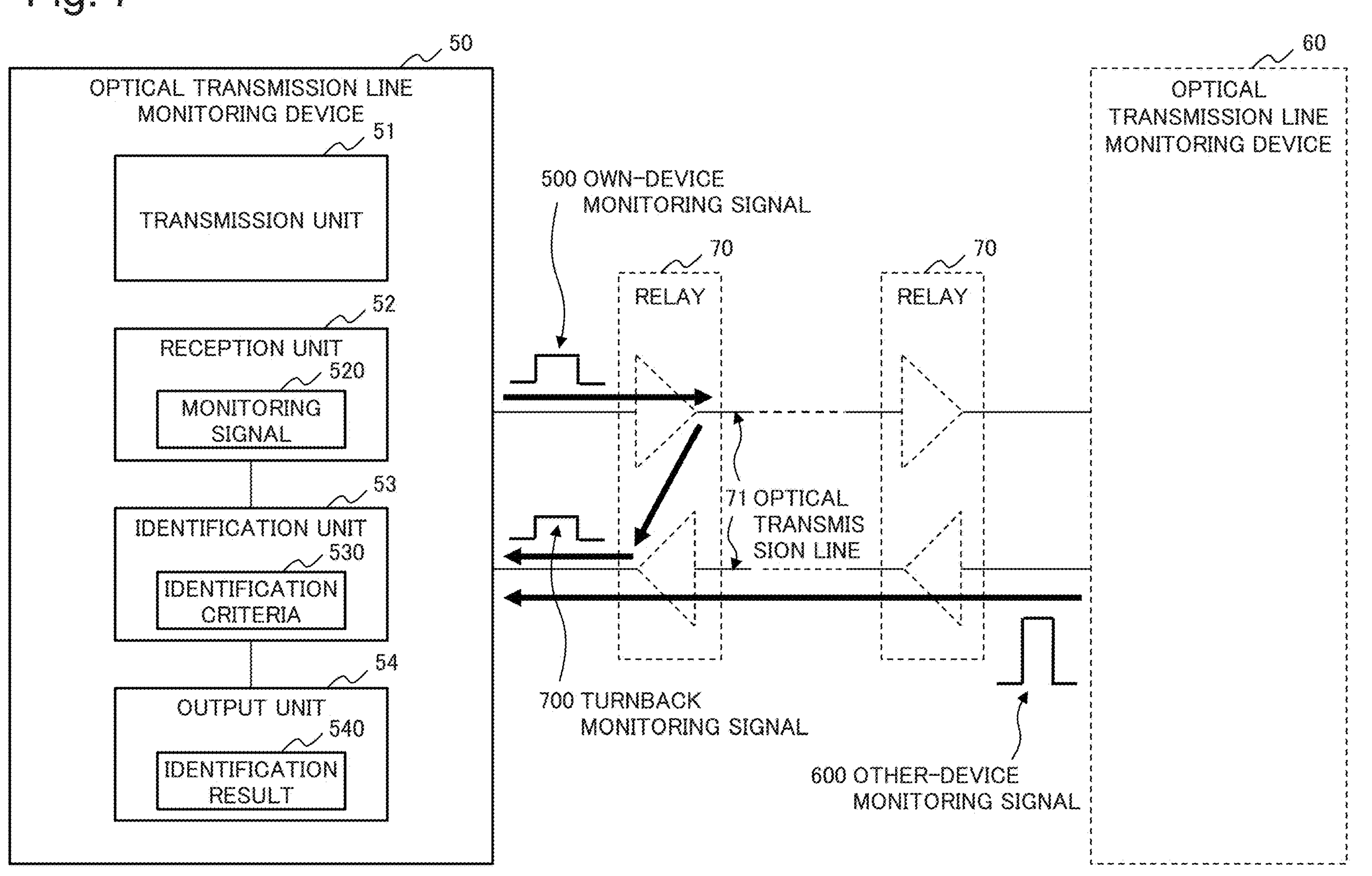

Fig. 7
50
OPTICAL TRANSMISSION LINE MONITORING DEVICE
51
TRANSMISSION UNIT
52
RECEPTION UNIT
520
MONITORING SIGNAL
53
IDENTIFICATION UNIT
530
IDENTIFICATION CRITERIA
54
OUTPUT UNIT
540
IDENTIFICATION RESULT
500 OWN-DEVICE MONITORING SIGNAL
70
RELAY
70
RELAY
71 OPTICAL TRANSMIS SION LINE
700 TURNBACK MONITORING SIGNAL
600 OTHER-DEVICE MONITORING SIGNAL
60
OPTICAL TRANSMISSION LINE MONITORING DEVICE

Fig. 8

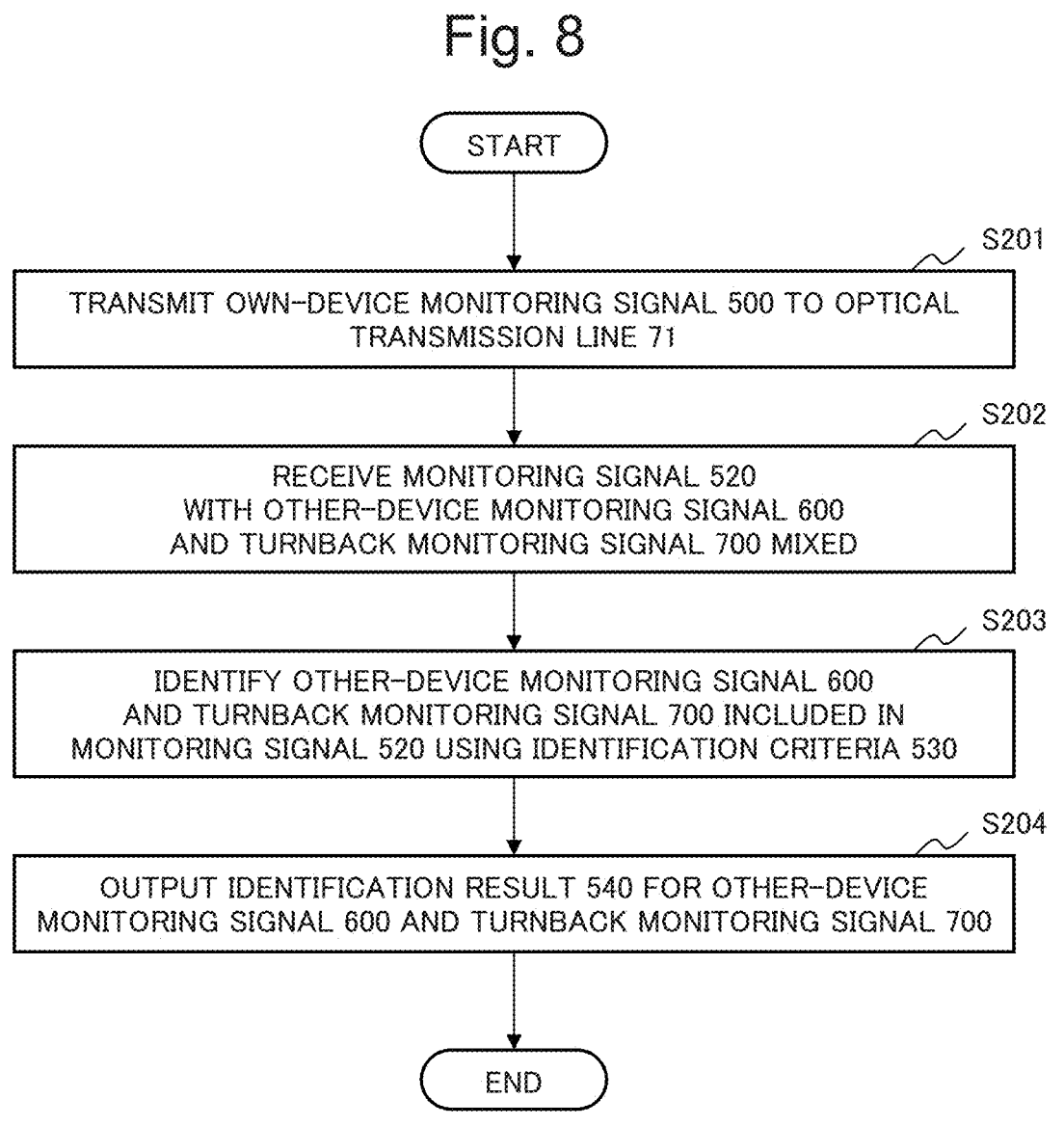

START

S201
TRANSMIT OWN-DEVICE MONITORING SIGNAL 500 TO OPTICAL TRANSMISSION LINE 71

S202
RECEIVE MONITORING SIGNAL 520 WITH OTHER-DEVICE MONITORING SIGNAL 600 AND TURNBACK MONITORING SIGNAL 700 MIXED

S203
IDENTIFY OTHER-DEVICE MONITORING SIGNAL 600 AND TURNBACK MONITORING SIGNAL 700 INCLUDED IN MONITORING SIGNAL 520 USING IDENTIFICATION CRITERIA 530

S204
OUTPUT IDENTIFICATION RESULT 540 FOR OTHER-DEVICE MONITORING SIGNAL 600 AND TURNBACK MONITORING SIGNAL 700

END

900
INFORMATION PROCESSING DEVICE
901
CPU
909
INPUT/OUTPUT INTERFACE
906
905
COMMUNICATION I/F
904
HARD DISK
903
RAM
902
ROM
908
READER/WRITER
907 RECORDING MEDIUM

OPTICAL TRANSMISSION LINE MONITORING DEVICE, OPTICAL TRANSMISSION LINE MONITORING METHOD, AND RECORDING MEDIUM STORING OPTICAL TRANSMISSION LINE MONITORING PROGRAM

This application is based upon and claims the benefit of priority from Japanese Patent Application No. 2023-109038, filed on Jul. 3, 2023, the disclosure of which is incorporated herein in its entirety by reference.

TECHNICAL FIELD

The present invention relates to an optical transmission line monitoring device, an optical transmission line monitoring method, and an optical transmission line monitoring program.

BACKGROUND ART

In optical transmission systems configured as social infrastructure, techniques for detecting failures with simple configurations in a short time are expected.

In relation to the technique described above, Patent Literature 1 (JP H08-265261 A) discloses a line monitoring method in which a wavelength of a turnback signal turned back from each relay and a wavelength of a main line signal transmitted from a transmission end station do not overlap each other by setting main line signals for uplink and downlink optical transmission lines to different wave lengths. In this method, a demultiplexing circuit is used in a reception end station to separate the main line signal and the turnback signal. In addition, in this method, the level of the separated turnback signal is increased to detect a monitoring signal within the turnback signal in a short time.

SUMMARY

A main object of the present invention is to more reliably monitor an optical transmission line using opposing bidirectional monitoring signals.

An optical transmission line monitoring device according to an aspect of the present invention is one of two optical transmission line monitoring devices facing each other and connected by an optical transmission line relayed by a relay, the optical transmission line monitoring device including a transmission means for transmitting an own-device monitoring signal to the optical transmission line, a reception means for receiving a monitoring signal in which a turnback monitoring signal and an other-device monitoring signal are mixed, the turnback monitoring signal being the own-device monitoring signal turned back through control by the relay, the other-device monitoring signal having a pulse width and an amplitude different from a pulse width and an amplitude of the own-device monitoring signal and being transmitted from an optical transmission line monitoring device facing the optical transmission line monitoring device, an identification means for identifying the turnback monitoring signal and the other-device monitoring signal included in the monitoring signal by using identification criteria for identifying the turnback monitoring signal and the other-device monitoring signal from the monitoring signal, and an output means for outputting an identification result for the turnback monitoring signal and the other-device monitoring signal.

In another aspect of achieving the above object, an optical transmission line monitoring method according to an aspect of the present invention includes steps performed by one of two optical transmission line monitoring devices facing each other and connected by an optical transmission line relayed by a relay, the steps being transmitting an own-device monitoring signal to the optical transmission line, receiving a monitoring signal in which a turnback monitoring signal and an other-device monitoring signal are mixed, the turnback monitoring signal being the own-device monitoring signal turned back through control by the relay, the other-device monitoring signal having a pulse width and an amplitude different from a pulse width and an amplitude of the own-device monitoring signal and being transmitted from an optical transmission line monitoring device facing the optical transmission line monitoring device, identifying the turnback monitoring signal and the other-device monitoring signal included in the monitoring signal by using identification criteria for identifying the turnback monitoring signal and the other-device monitoring signal from the monitoring signal, and outputting an identification result for the turnback monitoring signal and the other-device monitoring signal.

In still another aspect of achieving the above object, an optical transmission line monitoring program according to an aspect of the present invention causes one of two optical transmission line monitoring devices, facing each other and connected by an optical transmission line relayed by a repeater, to execute a transmission process to transmit an own-device monitoring signal to the optical transmission line, a reception process to receive a monitoring signal in which a turnback monitoring signal and an other-device monitoring signal are mixed, the turnback monitoring signal being the own-device monitoring signal turned back through control by the relay, the other-device monitoring signal having a pulse width and an amplitude different from a pulse width and an amplitude of the own-device monitoring signal and being transmitted from an optical transmission line monitoring device facing the optical transmission line monitoring device, an identification process to identify the turnback monitoring signal and the other-device monitoring signal included in the monitoring signal by using identification criteria for identifying the turnback monitoring signal and the other-device monitoring signal from the monitoring signal, and an output process to output an identification result for the turnback monitoring signal and the other-device monitoring signal.

Furthermore, the present invention can also be implemented by a computer-readable non-transitory recording medium storing the optical transmission line monitoring program (computer program).

BRIEF DESCRIPTION OF THE DRAWINGS

FIG. 1 is a block diagram illustrating a configuration of an optical transmission line monitoring system 1 according to the present disclosure;

FIG. 3A is a diagram (1/2) illustrating examples of the waveform pattern of the monitoring signal indicated by the monitoring signal reception result 181 in the optical transmission line monitoring device 10 according to the present disclosure;

FIG. 3B is a diagram (2/2) illustrating examples of the waveform pattern of the monitoring signal indicated by the monitoring signal reception result 181 in the optical transmission line monitoring device 10 according to the present disclosure;

FIG. 4 is a diagram illustrating contents of identification criteria 182 in the optical transmission line monitoring device 10 according to the present disclosure;

FIG. 7 is a block diagram illustrating a configuration of an optical transmission line monitoring device 50 according to the present disclosure;

FIG. 8 is a flowchart illustrating the operation of the optical transmission line monitoring device 50 according to the present disclosure.

EXAMPLE EMBODIMENT

Figure 2:
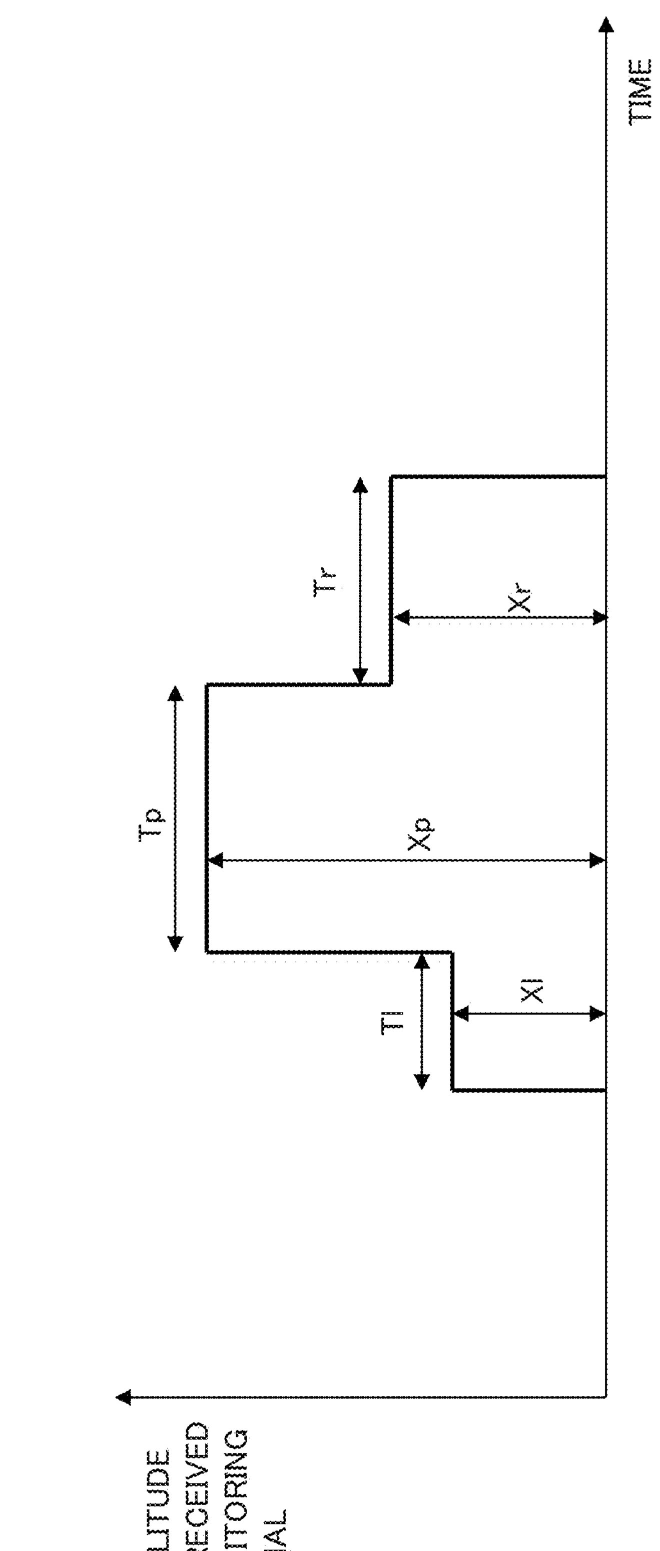
FIG. 2 is a diagram illustrating an example of a definition of a waveform of a monitoring signal indicated by a monitoring signal reception result 181 in an optical transmission line monitoring device 10 according to the present disclosure.

Hereinafter, embodiments of the present invention will be described in detail with reference to the drawings.

First Example Embodiment

FIG. 1 is a block diagram illustrating a configuration of an optical transmission line monitoring system 1 according to the present disclosure. The optical transmission line monitoring system 1 includes two optical transmission line monitoring devices 10, 20 facing each other, an optical transmission line 31 that communicably connects the optical transmission line monitoring device 10 and the optical transmission line monitoring device 20 via one or more relays 30, and a management terminal 40. In the present example embodiment, the optical transmission line monitoring device 10 may be referred to as the own station, and the optical transmission line monitoring device 20 may be referred to as the counter station. The optical transmission line monitoring devices 10, 20 monitor the states of the relay 30 and the optical transmission line 31 and diagnose the occurrence of a failure in the relay 30 or the optical transmission line 31.

The management terminal 40 is an information processing device such as a personal computer, a tablet terminal, or a smartphone used by a user of the optical transmission line monitoring device 10 or the optical transmission line monitoring device 20. The management terminal 40 receives an input operation by the user and inputs information input by the user to the optical transmission line monitoring device 10 or the optical transmission line monitoring device 20. The management terminal 40 includes a display screen 400 and displays information output from the optical transmission line monitoring device 10 or the optical transmission line monitoring device 20 on the display screen 400.

Each of the optical transmission line monitoring devices 10, 20 is an information processing device such as a server, for example. Each of the optical transmission line monitoring devices 10, 20 may be, for example, a device constructed as a server that provides a service in an environment where at least a part of the configuration of the device is cloud computing. The optical transmission line monitoring devices 10, 20 have equivalent functions, and in the present example embodiment, the operation of the optical transmission line monitoring device 10 will be mainly described.

The optical transmission line monitoring device 10 includes a transmission unit 11, a reception unit 12, an identification unit 13, an output unit 14, an identification criteria learning unit 15, a diagnosis unit 16, a diagnosis criteria learning unit 17, and a storage unit 18. The transmission unit 11, the reception unit 12, the identification unit 13, the output unit 14, the identification criteria learning unit 15, the diagnosis unit 16, and the diagnosis criteria learning unit 17 are examples of a transmission means, a reception means, an identification means, an output means, an identification criteria learning means, a diagnosis means, and a diagnosis criteria learning means, in turn.

The storage unit 18 is, for example, a storage device such as a random access memory (RAM) or a hard disk 904 described later with reference to FIG. 9. The storage unit 18 may be provided in one or more external devices capable of communicating with the optical transmission line monitoring device 10. The storage unit 18 stores a monitoring signal reception result 181, identification criteria 182, an identification result 183, diagnosis criteria 184, and a diagnosis result 185. These pieces of information stored in the storage unit 18 will be described later.

The transmission unit 11 transmits an own-device monitoring signal 100 to the optical transmission line 31 toward the optical transmission line monitoring device 20 that is the counter station. The own-device monitoring signal 100 is singly transmitted at predetermined time intervals, for example, to monitor the states of the relay 30 and the optical transmission line 31. The own-device monitoring signal 100 is, for example, a rectangular wave, but may be a signal having a waveform different from the rectangular wave as long as the peak level of the signal can be captured.

Similarly to the optical transmission line monitoring device 10, the optical transmission line monitoring device 20 also transmits an other-device monitoring signal 200 to the optical transmission line 31 toward the opposing optical transmission line monitoring device 10. Similarly to the own-device monitoring signal 100, the other-device monitoring signal 200 is also singly transmitted at predetermined time intervals, for example, to monitor the states of the relay 30 and the optical transmission line 31.

Note that the own-device monitoring signal 100 and the other-device monitoring signal 200 have different specifications, and more specifically, have different pulse widths and amplitudes (peak levels of signals).

A part of the own-device monitoring signal 100 transmitted from the transmission unit 11 to the optical transmission line monitoring device 20 is turned back by the control of the relay 30 and becomes a turnback monitoring signal 300 to be directed to the optical transmission line monitoring device 10. A part of the other-device monitoring signal 200 transmitted from the optical transmission line monitoring device 20 to the optical transmission line monitoring device 10 reaches the optical transmission line monitoring device 10 without being turned back by the control of the relay 30.

The reception unit 12 receives a monitoring signal in which the other-device monitoring signal 200 and the turnback monitoring signal 300 are mixed via the optical transmission line 31, and stores the monitoring signal reception result 181, indicating the result of the reception, in the storage unit 18. The own-device monitoring signal 100 transmitted from the transmission unit 11 attenuates in the process of traveling through the optical transmission line 31 and in the process of being turned back at the relay 30, so that the amplitude of the turnback monitoring signal 300 is usually smaller than that of the own-device monitoring signal 100. Note that the own-device monitoring signal 100 and the turnback monitoring signal 300 have the same pulse width. The other-device monitoring signal 200 transmitted from the optical transmission line monitoring device 20 attenuates in the process of traveling through the optical transmission line 31 and the process of passing through the relay 30, so that the amplitude of the other-device monitoring signal 200 received by the reception unit 12 is usually smaller than the amplitude thereof when transmitted from the optical transmission line monitoring device 20. Note that the pulse width of the other-device monitoring signal 200 does not change in the process of traveling through the optical transmission line 31 or in the process of passing through the relay 30.

FIG. 2 is a diagram illustrating an example of a definition of a waveform of a monitoring signal indicated by the monitoring signal reception result 181 in the optical transmission line monitoring device 10 according to the present disclosure. Since the other-device monitoring signal 200 and the turnback monitoring signal 300 are mixed (overlap) in the monitoring signal received by the reception unit 12, the waveform of the monitoring signal is defined as illustrated in FIG. 2.

In the example illustrated in FIG. 2, the pulse width of the own-device monitoring signal 100 and the turnback monitoring signal 300 is Ta, and the pulse width of the other-device monitoring signal 200 is Tb. In the present example embodiment, Ta is larger in value than Tb, and the amplitude of the other-device monitoring signal 200 is larger in value than the amplitude of the own-device monitoring signal 100.

In the waveform of the monitoring signal illustrated in FIG. 2, a period in which the amplitude is the maximum value is defined as Tp, and the amplitude (i.e., the maximum value of the amplitude) is defined as Xp. In the waveform of the monitoring signal illustrated in FIG. 2, a period in which the amplitude is smaller than the maximum value before the amplitude becomes maximum is defined as Tl, and the amplitude is defined as Xl. In the waveform of the monitoring signal illustrated in FIG. 2, a period after the amplitude becomes a value smaller than the maximum value is defined as Tr, and the amplitude is defined as Xr.

The identification unit 13 identifies the turnback monitoring signal 300 and the other-device monitoring signal 200 included in the monitoring signal from the waveform of the monitoring signal indicated by the monitoring signal reception result 181 using the identification criteria 182. An identification method for the turnback monitoring signal 300 and the other-device monitoring signal 200 by the identification unit 13 will be described with reference to FIGS. 3A, 3B, and 4.

FIGS. 3A and 3B are diagrams each illustrating examples of the waveform pattern of the monitoring signal indicated by the monitoring signal reception result 181 in the optical transmission line monitoring device 10 according to the present disclosure. As illustrated in FIGS. 3A and 3B, there are nine types of waveform patterns indicated as waveform patterns 1 to 9 of the monitoring signal received by the reception unit 12 depending on the overlapping state of the turnback monitoring signal 300 and the other-device monitoring signal 200.

FIG. 4 is a diagram illustrating the contents of the identification criteria 182 in the optical transmission line monitoring device 10 according to the present disclosure. As illustrated in FIG. 4, the identification criteria 182 indicates an identification method for identifying the turnback monitoring signal 300 and the other-device monitoring signal 200 included in the monitoring signal with respect to each of waveform patterns 1 to 9 illustrated in FIGS. 3A and 3B. With respect to the turnback monitoring signal 300 and the other-device monitoring signal 200, the identification criteria 182 indicates, on the time axis, the relationship between the identification result 183 and any one of the following states: a state where the signals are not in contact and do not overlap, a state where the signals are in contact without overlapping, a state where one signal overlaps in such a way as to include the other, and a state where the signals partially overlap.

As illustrated in FIG. 4, waveform pattern 1 illustrated in FIG. 3A has a waveform characteristic where its waveform characteristic is Tb. Thus, the turnback monitoring signal 300 having the pulse width of Ta larger than Tb is not included in the monitoring signal received by the reception unit 12. Therefore, as illustrated in FIG. 4, the identification unit 13 identifies (determines) that only the other-device monitoring signal 200 is included in the monitoring signal.

As illustrated in FIG. 4, waveform pattern 2 illustrated in FIG. 3A has waveform characteristics where its pulse width is Ta and there is no step in the amplitude. Thus, the other-device monitoring signal 200 having an amplitude larger than that of the own-device monitoring signal 100 (i.e., the turnback monitoring signal 300) is not included in the monitoring signal received by the reception unit 12. Therefore, as illustrated in FIG. 4, the identification unit 13 identifies that only the turnback monitoring signal 300 is included in the monitoring signal.

As illustrated in FIG. 4, waveform pattern 3 illustrated in FIG. 3A has waveform characteristics where its pulse width is Ta and Xl=Xr. As illustrated in FIG. 4, waveform pattern 4 illustrated in FIG. 3A has waveform characteristics where its pulse width is Ta and Xl=0. As illustrated in FIG. 4, waveform pattern 5 illustrated in FIG. 3A has a waveform characteristic where its pulse width is Ta and Xr=0. Waveform patterns 3 to 5 are states in which the other-device monitoring signal 200 overlaps in such a way as to completely include the turnback monitoring signal 300. In the case of waveform patterns 3 to 5, as illustrated in FIG. 4, the amplitude of the portion of the other-device monitoring signal 200 is expressed as "Xp-max(Xl, Xr)" and the amplitude of the turnback monitoring signal 300 part is expressed as "max(Xl, Xr)". Thus, the identification unit 13 identifies the other-device monitoring signal 200 and the turnback monitoring signal 300 included in the monitoring signal received by the reception unit 12 using the mathematical formula described above. However, in the mathematical formula described above, "max(Xl, Xr)" represents the larger one of Xl and Xr, and "-" is an operator that enables division.

As illustrated in FIG. 4, waveform pattern 6 illustrated in FIG. 3B has waveform characteristics where its pulse width is longer than Ta, Xl and Xr are not 0, and Xl is larger than Xr. As illustrated in FIG. 4, waveform pattern 7 illustrated in FIG. 3B has waveform characteristics where its pulse width is longer than Ta, Xl and Xr are not 0, and Xl is smaller than Xr. Waveform patterns 6 and 7 are in a state where a portion of the other-device monitoring signal 200 overlaps the turnback monitoring signal 300. In the case of waveform patterns 6 and 7, as illustrated in FIG. 4, the amplitude of the portion of the other-device monitoring signal 200 is expressed as "Xp-max(Xl, Xr)" and the amplitude of the turnback monitoring signal 300 part is expressed as "min(Xl, Xr)". Thus, the identification unit 13 identifies the other-device monitoring signal 200 and the turnback monitoring signal 300 included in the monitoring signal received by the reception unit 12 using the mathematical formula described above. However, in the mathematical formula described above, "min(Xl, Xr)" represents a smaller one of Xl and Xr.

As illustrated in FIG. 4, waveform pattern 8 illustrated in FIG. 3B has waveform characteristics where its pulse width is longer than Ta and Tl is 0. As illustrated in FIG. 4, waveform pattern 9 illustrated in FIG. 3B has waveform characteristics where its pulse width longer than Ta and Xr is 0. Waveform patterns 8 and 9 are in a state where the other-device monitoring signal 200 and the turnback monitoring signal 300 are in contact without overlapping. In the case of waveform patterns 8 and 9, as illustrated in FIG. 4, the amplitude of the portion of the other-device monitoring signal 200 is expressed as "max((Xl or Xr), Xp" and the amplitude of the turnback monitoring signal 300 part is expressed as "min((Xl or Xr), Xp". Thus, the identification unit 13 identifies the other-device monitoring signal 200 and the turnback monitoring signal 300 included in the monitoring signal received by the reception unit 12 using the mathematical formula described above. However, in the mathematical formula described above, "(Xl or Xr)" represents Xl or Xr. More specifically, "(Xl or Xr)" represents Xr having a non-zero value in waveform pattern 8, and represents Xl having a non-zero value in waveform pattern 9.

The identification unit 13 stores the identification result 183, obtained by identifying the other-device monitoring signal 200 and the turnback monitoring signal 300 included in the monitoring signal received by the reception unit 12 as described above, in the storage unit 18.

The output unit 14 outputs the identification result 183 to the management terminal 40 and displays the identification result 183 on the display screen 400.

Figure 5:
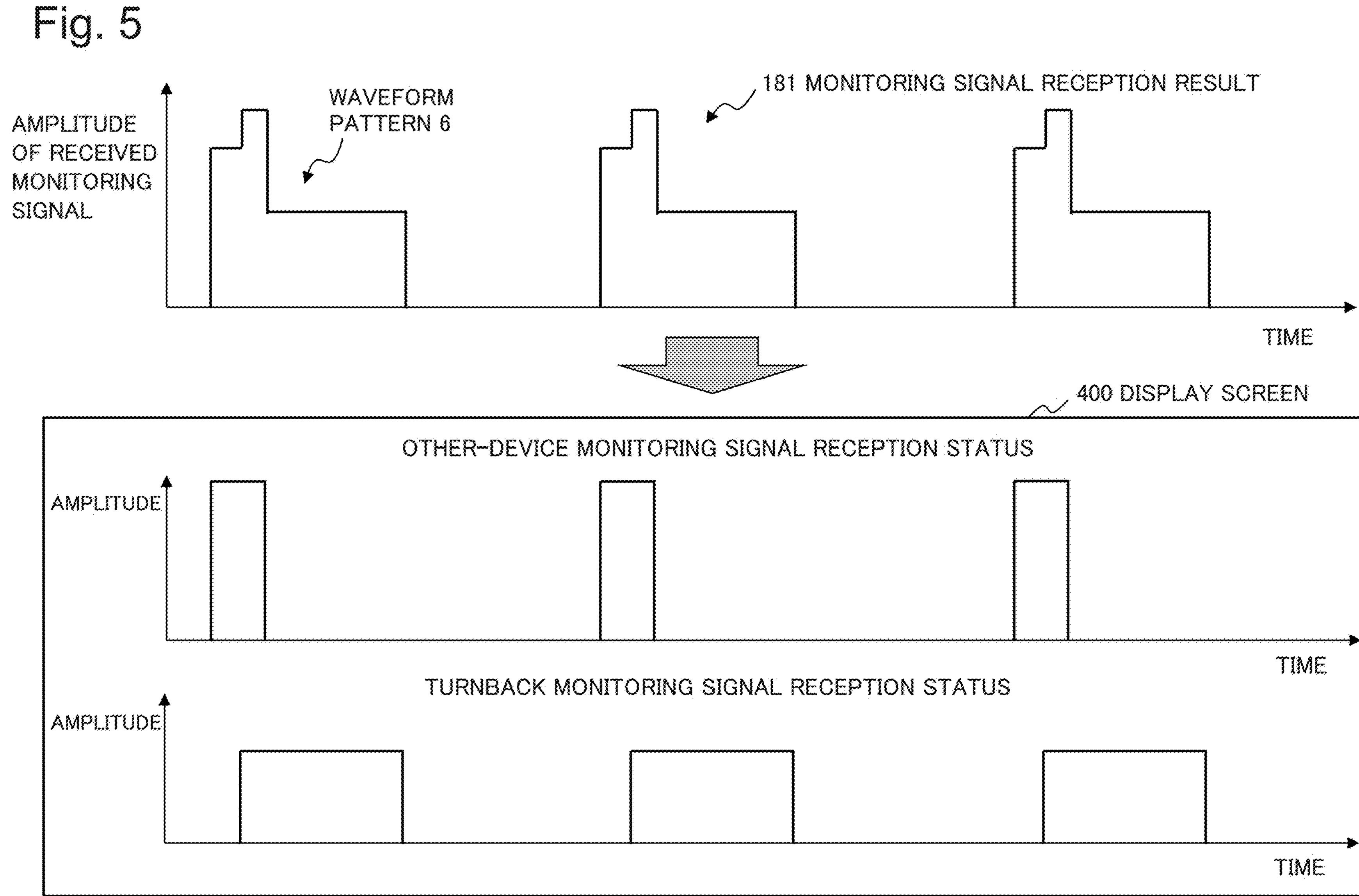
FIG. 5 is a diagram illustrating an example of a mode in which the optical transmission line monitoring device 10 according to the present disclosure displays an identification result 183 on a display screen 400 of a management terminal 40.

FIG. 5 is a diagram illustrating an example of a mode in which the optical transmission line monitoring device 10 according to the present disclosure displays the identification result 183 on the display screen 400 of the management terminal 40. In the example illustrated in FIG. 5, the monitoring signal reception result 181 from the reception unit 12 indicates the reception of the monitoring signal of waveform pattern 6 illustrated in FIG. 3B. In this case, the output unit 14 may individually display the waveform of the turnback monitoring signal 300 and the waveform of the other-device monitoring signal 200, indicated by the identification result 183 from the identification unit 13, on the display screen 400 on the same time axis as illustrated in the lower part of FIG. 5.

The identification criteria learning unit 15 generates or updates the identification criteria 182 as a learning model that has learned the relationship among the waveform of the monitoring signal received by the reception unit 12, the specifications of the own-device monitoring signal 100 and the other-device monitoring signal 200, and the identification result 183 from the identification unit 13 as illustrated in FIGS. 3A and 3B, for example. The specifications of the own-device monitoring signal 100 and the other-device monitoring signal 200 used by the identification criteria learning unit 15 in the learning described above may include, for example, the pulse widths and amplitudes of the own-device monitoring signal 100 and the other-device monitoring signal 200, time intervals for the transmission to the optical transmission line 31, and the like. The waveform of the monitoring signal used by the identification criteria learning unit 15 in the learning described above may include, for example, the values of Tp, Tl, Tr, Xp, Xl, and Xr illustrated in FIG. 2.

Also, in the learning described above, the identification criteria learning unit 15 may use information indicating the environment of communication through the optical transmission line 31, including, for example, the distance between the optical transmission line monitoring device 10 and the optical transmission line monitoring device 20, the distances between each relay 30 and both the optical transmission line monitoring device 10 and the optical transmission line monitoring device 20, and the like.

The diagnosis unit 16 diagnoses the states of the relay 30 and the optical transmission line 31 using the diagnosis criteria 184 for diagnosing the states of the relay 30 and the optical transmission line 31 from the turnback monitoring signal 300 and the other-device monitoring signal 200 indicated by the identification result 183 from the identification unit 13. For example, when the turnback monitoring signal 300 or the other-device monitoring signal 200, which should be received by the reception unit 12, is missing, or when the amplitude of the received turnback monitoring signal 300 or the other-device monitoring signal 200 is smaller than a predetermined threshold (that is, greatly attenuated), the diagnosis criteria 184 indicate that a failure may have occurred in at least one of the relay 30 and the optical transmission line 31. The diagnosis criteria 184 indicate that a failure may have occurred in at least one of the relay 30 and the optical transmission line 31, for example, when the difference between the state of the turnback monitoring signal 300 or the other-device monitoring signal 200 received by the reception unit 12 and the state received in a normal state in which no failure occurs exceeds a given threshold.

The diagnosis unit 16 stores the diagnosis result 185, obtained by diagnosing the states of the relay 30 and the optical transmission line 31, in the storage unit 18.

The diagnosis criteria learning unit 17 generates or updates the diagnosis criteria 184 as a learning model that has learned the relationship among the identification result 183 from the identification unit 13, the specifications of the own-device monitoring signal 100 and the other-device monitoring signal 200, and the states of the relay 30 and the optical transmission line 31. The specifications of the own-device monitoring signal 100 and the other-device monitoring signal 200 used by the diagnosis criteria learning unit 17 in the learning described above may include, for example, the pulse widths and amplitudes of the own-device monitoring signal 100 and the other-device monitoring signal 200, time intervals for the transmission to the optical transmission line 31, and the like. The diagnosis criteria learning unit 17 may also use information indicating the environment of communication through the optical transmission line 31 in the learning described above, similarly to the identification criteria learning unit 15.

Figure 6:
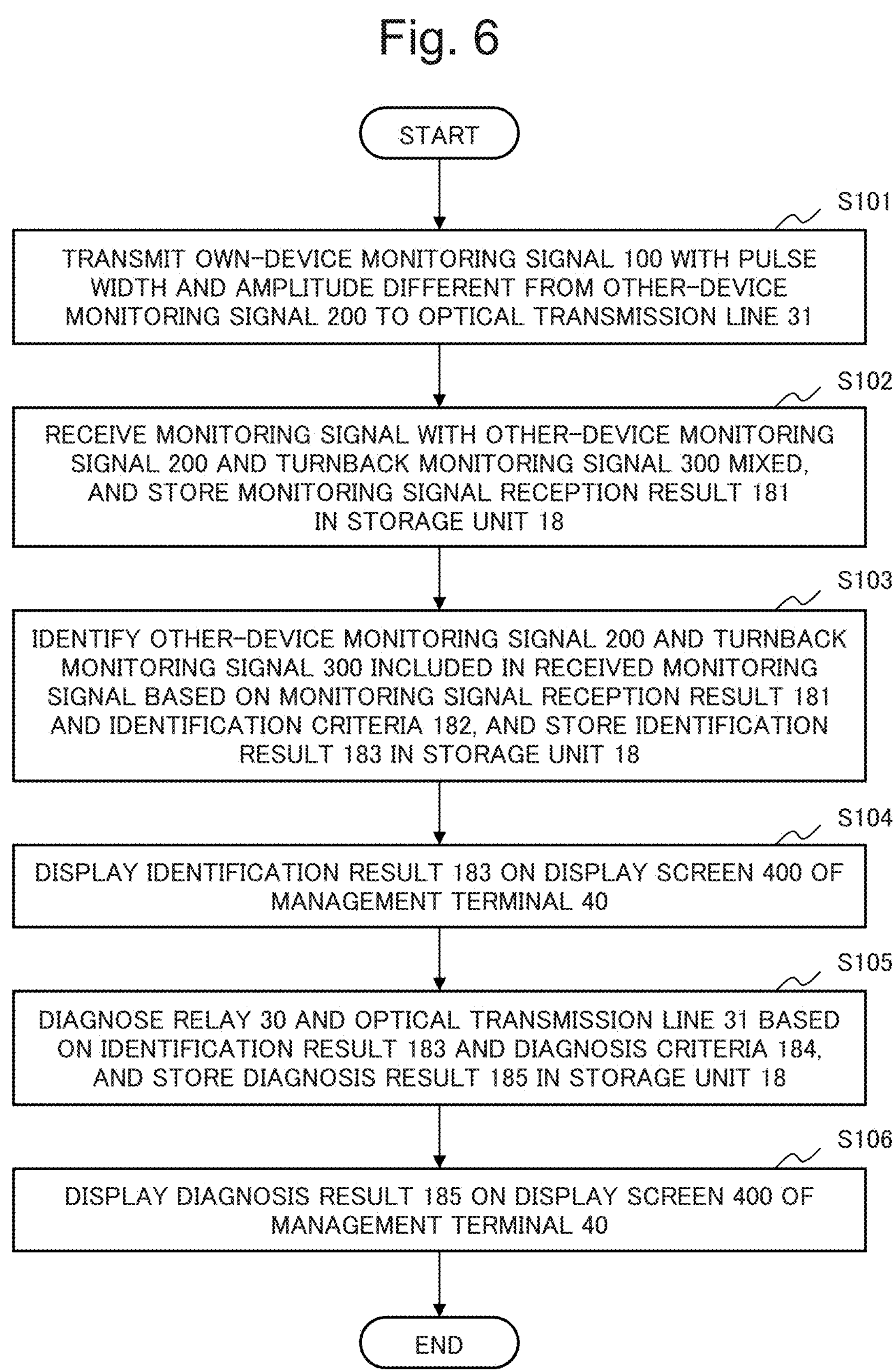
FIG. 6 is a flowchart illustrating the operation of the optical transmission line monitoring device 10 according to the present disclosure.

Next, the operation (processes) of the optical transmission line monitoring device 10 according to the present disclosure will be described in detail with reference to a flowchart of FIG. 6.

The transmission unit 11 transmits, to the optical transmission line 31, the own-device monitoring signal 100 having a pulse width and an amplitude different from those of the other-device monitoring signal 200 transmitted from the optical transmission line monitoring device 20 that faces the optical transmission line monitoring device 10 (step S101). The reception unit 12 receives the monitoring signal in which the other-device monitoring signal 200 and the turnback monitoring signal 300 are mixed. Here, the turnback monitoring signal 300 is the own-device monitoring signal 100 turned back via the relay 30. Then, the reception unit 12 stores the monitoring signal reception result 181 in the storage unit 18 (step S102).

On the basis of the monitoring signal reception result 181 and the identification criteria 182, the identification unit 13 identifies the other-device monitoring signal 200 and the turnback monitoring signal 300 included in the received monitoring signal, and stores the identification result 183 in the storage unit 18 (step S103). The output unit 14 individually displays the waveforms of the turnback monitoring signal 300 and the other-device monitoring signal 200 indicated by the identification result 183 on the display screen 400 of the management terminal 40 (step S104).

The diagnosis unit 16 diagnoses the relay 30 and the optical transmission line 31 on the basis of the identification result 183 from the identification unit 13 and the diagnosis criteria 184, and stores the diagnosis result 185 in the storage unit 18 (step S105). The output unit 14 displays the diagnosis result 185 from the diagnosis unit 16 on the display screen 400 of the management terminal 40 (step S106), and the entire processing ends.

The optical transmission line monitoring device 10 according to the present disclosure can more reliably monitor the optical transmission line using the opposing bidirectional monitoring signals. This is because the optical transmission line monitoring device 10 transmits the own-device monitoring signal 100 having a pulse width and an amplitude different from those of the other-device monitoring signal 200 from the opposing optical transmission line monitoring device 20 to the optical transmission line 31. Then, using the identification criteria 182, the optical transmission line monitoring device 10 identifies the other-device monitoring signal 200 and the turnback monitoring signal 300 included in the received monitoring signal, where the turnback monitoring signal 300 is the own-device monitoring signal 100 turned back via the relay 30.

Hereinafter, effects achieved by the optical transmission line monitoring device 10 according to the present disclosure will be described in detail.

In optical transmission systems, as a method for monitoring the states of relays and optical transmission lines, a method may be employed in which a monitoring signal with a specific wavelength is used and information is added to the monitoring signal or to the fluctuating state of its light level. At this time, for example, there is a method used in monitoring by both stations facing each other, where the monitoring signals from both stations are set to pulse widths different from each other to determine from which of the two stations the monitoring signal has been transmitted. However, it is desirable that the monitoring signals from both stations can be more easily discriminated, and the optical transmission lines can be more reliably monitored using the monitoring signals. That is, the challenge is to more reliably monitor the optical transmission line using opposing bidirectional monitoring signals.

To meet such a challenge, the optical transmission line monitoring device 10 according to the present disclosure transmits the own-device monitoring signal 100 to the optical transmission line 31. The optical transmission line monitoring device 10 receives a monitoring signal in which the turnback monitoring signal 300 and the other-device monitoring signal 200 are mixed. Here, the turnback monitoring signal 300 is the own-device monitoring signal 100 turned back through control by the relay 30, and the other-device monitoring signal 200 has a pulse width and an amplitude different from those of the own-device monitoring signal 100 and is transmitted from the opposing optical transmission line monitoring device 20. The optical transmission line monitoring device 10 identifies the turnback monitoring signal 300 and the other-device monitoring signal 200 included in the monitoring signal, using the identification criteria 182 for identifying the turnback monitoring signal 300 and the other-device monitoring signal 200 from the monitoring signal. Then, the optical transmission line monitoring device 10 outputs identification result 183 for the turnback monitoring signal 300 and the other-device monitoring signal 200. That is, the optical transmission line monitoring device 10 transmits the monitoring signal such that the pulse width and the amplitude are different from those of the monitoring signal from the counter station, thereby making it easier to identify the monitoring signal from the own station and the monitoring signal from the counter station, and then identifies each of the monitoring signals from the own station and the counter station using the identification criteria 182 for identifying the monitoring signals from the own station and the counter station from a state where the monitoring signals from the both stations are mixed. As a result, the optical transmission line monitoring device 10 can more reliably monitor the optical transmission line using the opposing bidirectional monitoring signals.

The optical transmission line monitoring device 10 according to the present disclosure individually displays the waveform of the turnback monitoring signal 300 and the waveform of the other-device monitoring signal 200, indicated by the identification result 183 from the identification unit 13, on the display screen 400 as illustrated in FIG. 5, for example. As a result, the optical transmission line monitoring device 10 can present the reception status of the turnback monitoring signal 300 and the other-device monitoring signal 200 to the user in an easy-to-understand manner.

The optical transmission line monitoring device 10 according to the present disclosure generates or updates the identification criteria 182 indicating the result of learning the relationship among the waveform of the monitoring signal indicated by the monitoring signal reception result 181, the specifications of the own-device monitoring signal 100 and the other-device monitoring signal 200, and the identification result 183 from the identification unit 13. As a result, the optical transmission line monitoring device 10 can efficiently improve the accuracy of identifying the turnback monitoring signal 300 and the other-device monitoring signal 200 included in the monitoring signal indicated by the monitoring signal reception result 181.

The optical transmission line monitoring device 10 according to the present disclosure generates or updates the identification criteria 182 indicating the result of learning the relationship between the distance between the optical transmission line monitoring devices 20 and the distance between the relay 30 and each of the two optical transmission line monitoring devices 10, 20, and the identification result 183 from the identification unit 13. That is, since the optical transmission line monitoring device 10 generates or updates the identification criteria 182 in consideration of the environment of communication through the optical transmission line 31, it is possible to further improve the accuracy of identifying the turnback monitoring signal 300 and the other-device monitoring signal 200 included in the monitoring signal indicated by the monitoring signal reception result 181.

The optical transmission line monitoring device 10 according to the present disclosure diagnoses the states of the relay 30 and the optical transmission line 31 using the identification result 183 and the diagnosis criteria 184 for diagnosing the states of the relay 30 and the optical transmission line 31 from the turnback monitoring signal 300 and the other-device monitoring signal 200 indicated by the identification result 183. As a result, the optical transmission line monitoring device 10 can reduce the load on the user related to the work of diagnosing the relay 30 and the optical transmission line 31.

The optical transmission line monitoring device 10 according to the present disclosure generates or updates the diagnosis criteria 184 indicating the result of learning the relationship among the identification result 183, the specifications of the own-device monitoring signal 100 and the other-device monitoring signal 200, and the states of the relay 30 and the optical transmission line 31. As a result, the optical transmission line monitoring device 10 can efficiently improve the accuracy of diagnosing the relay 30 and the optical transmission line 31.

Second Example Embodiment

FIG. 7 is a block diagram illustrating a configuration of an optical transmission line monitoring device 50 according to the present disclosure.

The optical transmission line monitoring device 50 according to the present example embodiment includes a transmission unit 51, a reception unit 52, an identification unit 53, and an output unit 54. The transmission unit 51, the reception unit 52, the identification unit 53, and the output unit 54 are examples of a transmission means, a reception means, an identification means, and an output means, in turn. Note that the optical transmission line monitoring device 50 is a device facing an optical transmission line monitoring device 60 connected by an optical transmission line 71 relayed by a relay 70. The relay 70 is, for example, a device similar to the relay 30 according to the optical transmission line monitoring system 1. The optical transmission line 71 is, for example, a transmission line similar to the optical transmission line 31 according to the optical transmission line monitoring system 1.

The transmission unit 51 transmits an own-device monitoring signal 500 to the optical transmission line 71. The own-device monitoring signal 500 is, for example, a signal similar to the own-device monitoring signal 100 according to the optical transmission line monitoring system 1. The transmission unit 51 operates similarly to the transmission unit 11 according to the optical transmission line monitoring system 1, for example.

The reception unit 52 receives a monitoring signal 520 in which a turnback monitoring signal 700 and an other-device monitoring signal 600 are mixed. Here, the turnback monitoring signal 700 is the own-device monitoring signal 500 turned back through the control by the relay 70, and the other-device monitoring signal 600 has a pulse width and an amplitude different from those of the own-device monitoring signal 500 and is transmitted from the opposing optical transmission line monitoring device 60. The turnback monitoring signal 700 is, for example, a signal similar to the turnback monitoring signal 300 according to the optical transmission line monitoring system 1. The other-device monitoring signal 600 is, for example, a signal similar to the other-device monitoring signal 200 according to the optical transmission line monitoring system 1. The monitoring signal 520 is, for example, a signal similar to the signal indicated by the monitoring signal reception result 181 according to the optical transmission line monitoring system 1. The reception unit 52 operates similarly to the reception unit 12 according to the optical transmission line monitoring system 1, for example.

The identification unit 53 identifies the turnback monitoring signal 700 and the other-device monitoring signal 600 included in the monitoring signal 520, using identification criteria 530 for identifying the turnback monitoring signal 700 and the other-device monitoring signal 600 from the monitoring signal 520. The identification criteria 530 is, for example, criteria similar to the identification criteria 182 according to the optical transmission line monitoring system 1. The identification unit 53 operates similarly to the identification unit 13 according to the optical transmission line monitoring system 1, for example.

The output unit 54 outputs an identification result 540 for the turnback monitoring signal 700 and the other-device monitoring signal 600. The output unit 54 operates similarly to the output unit 14 according to the optical transmission line monitoring system 1, for example.

Next, the operation (processes) of the optical transmission line monitoring device 50 according to the present disclosure will be described in detail with reference to a flowchart of FIG. 8.

The transmission unit 51 transmits an own-device monitoring signal 500 to the optical transmission line 71 (step S201). The reception unit 52 receives the monitoring signal 520 in which the other-device monitoring signal 600, transmitted from the optical transmission line monitoring device 60, and the turnback monitoring signal 700 are mixed. Here, the turnback monitoring signal 700 is the own-device monitoring signal 500 turned back through control by the relay 70 (step S202).

The identification unit 53 identifies the other-device monitoring signal 600 and the turnback monitoring signal 700 included in the monitoring signal 520, using the identification criteria 530 (step S203). The output unit 54 outputs the identification result 540 for the other-device monitoring signal 600 and the turnback monitoring signal 700 (step S204), and the entire process ends.

The optical transmission line monitoring device 50 according to the present disclosure can more reliably monitor the optical transmission line using the opposing bidirectional monitoring signals. This is because the optical transmission line monitoring device 50 transmits the own-device monitoring signal 500 having a pulse width and an amplitude different from those of the other-device monitoring signal 600 from the opposing optical transmission line monitoring device 60 to the optical transmission line 31. Then, using the identification criteria 530, the optical transmission line monitoring device 50 identifies the other-device monitoring signal 600 and the turnback monitoring signal 700 included in the received monitoring signal 520, where the turnback monitoring signal 700 is the own-device monitoring signal 500 turned back via the relay 70.

<Hardware Configuration>

Each unit in the optical transmission line monitoring devices illustrated in FIGS. 1 and 7 in the example embodiments described above can be implemented by dedicated hardware (HW) (electronic circuit). In addition, in FIGS. 1 and 7, at least the following configurations can each be regarded as a functional (processing) unit (software modules) of a software program including an instruction executed by a processor.

- a transmission control function in the transmission units 11, 51;
- a reception control function in the reception units 12, 52;
- the identification units 13, 53;

the output units 14, 54;

the identification criteria learning unit 15;

the diagnosis unit 16;

the diagnosis criteria learning unit 17;

a storage control function in the storage unit 18.

However, the division of each unit as illustrated in these drawings is for descriptive convenience, and various configurations may be assumed during implementation. An example of a hardware environment in this case will be described with reference to FIG. 9.

Figure 9:
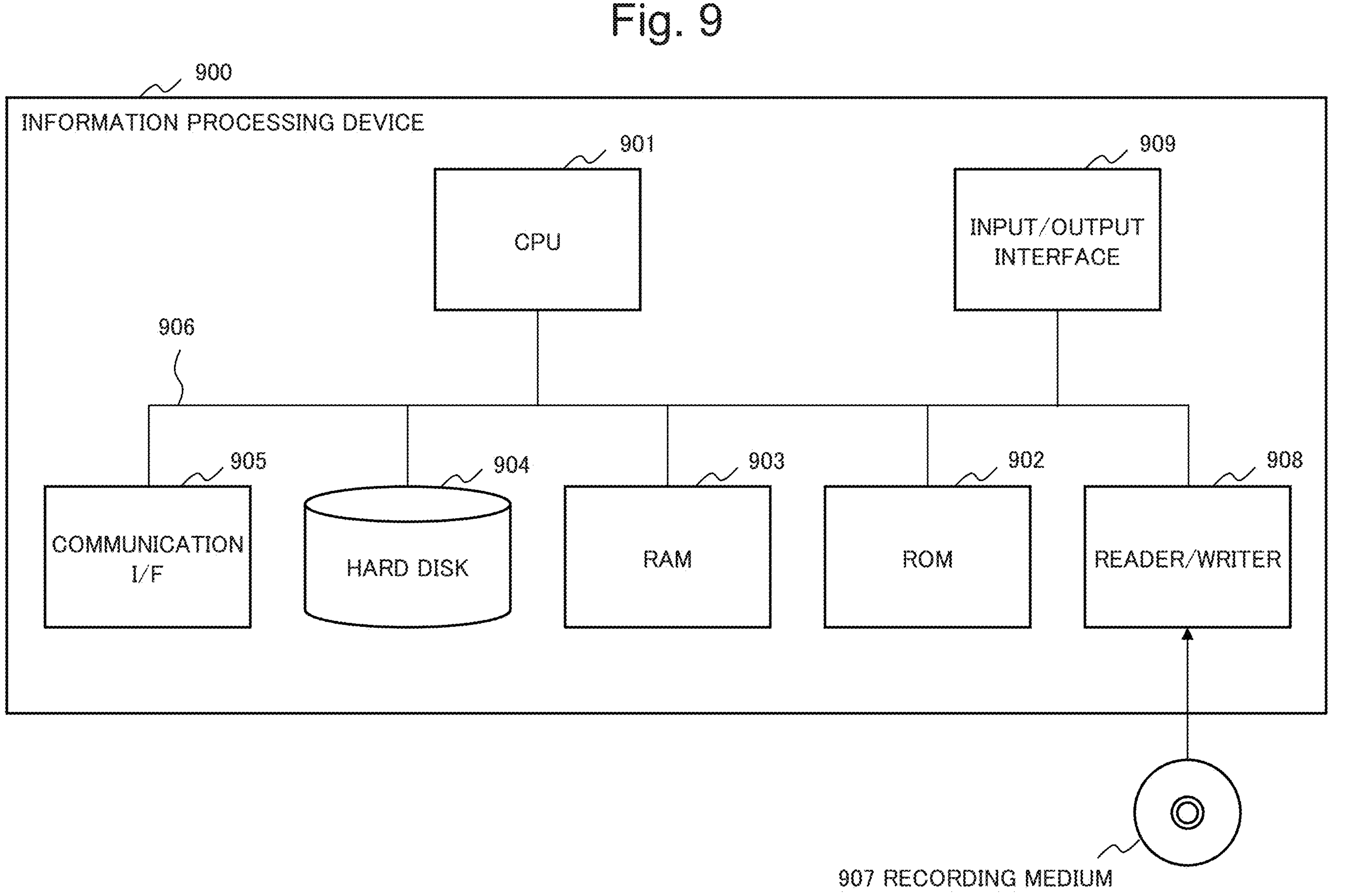
FIG. 9 is a block diagram illustrating a configuration of an information processing device 900 capable of implementing the optical transmission line monitoring device according to the present disclosure.

FIG. 9 is a diagram exemplarily describing a configuration of an information processing device 900 (computer) capable of implementing the optical transmission line monitoring device according to the present disclosure. That is, FIG. 9 is a configuration of a computer (information processing device) capable of implementing each of the optical transmission line monitoring devices illustrated in FIGS. 1 and 7, and represents a hardware environment capable of implementing each function in the example embodiments described above. However, the units in the optical transmission line monitoring device described above may be provided in a plurality of information processing devices 900 in a distributed manner, or at least some functions thereof may be provided in a server or the like constituting a cloud computing environment.

The information processing device 900 illustrated in FIG. 9 includes the following as components.

a central processing unit (CPU) 901;

a read only memory (ROM) 902;

a random access memory (RAM) 903;

a hard disk (storage device) 904;

a communication interface 905;

a bus 906 (communication line);

a reader/writer 908 capable of reading and writing data stored in a recording medium 907 such as a compact disc read only memory (CD-ROM);

an input/output interface 909 such as a monitor, a speaker, or a keyboard.

That is, the information processing device 900 including the above components is a general computer to which these components are connected via the bus 906. The information processing device 900 may include a plurality of CPUs 901 or may include a CPU 901 configured by multiple cores. The information processing device 900 may not include a part of the configuration described above.

Then, the present invention described using the example embodiments described above as examples supplies a computer program capable of implementing the following functions to the information processing device 900 illustrated in FIG. 9. The functions are those of the configurations described above in the block configuration diagrams (FIGS. 1 and 7) or the flowcharts (FIGS. 6 and 8) referred to in the description of the example embodiments. Thereafter, the present invention is achieved by reading, interpreting, and executing the computer program in the CPU 901 of the hardware. The computer program supplied into the device may be stored in a readable/writable volatile memory (RAM 903) or a non-transitory storage device such as the ROM 902 or the hard disk 904.

In the above case, a general procedure can be adopted at present as a method of supplying the computer program into the hardware. Examples of the procedure include a method of installing the program in the device via various recording media 907 such as a CD-ROM, and a method of downloading the program from the outside via a communication line such as the Internet. In such a case, the present invention can be considered to be constituted by a code that forms the computer program or by the recording medium 907 that stores the code.

The present invention has been described above using the example embodiments described above as exemplary examples. However, the present invention is not limited to the example embodiments described above. That is, the present invention can apply various aspects that can be understood by those skilled in the art within the scope of the present invention.

Note that some or all of the example embodiments described above can also be described as the following supplementary notes. However, the present invention exemplarily described by the example embodiments described above is not limited to the following.

Supplementary Note 1

An optical transmission line monitoring device that is one of two optical transmission line monitoring devices facing each other and connected by an optical transmission line relayed by a relay, the optical transmission line monitoring device including:

at least one memory storing a computer program; and at least one processor configured to execute the computer program to transmit an own-device monitoring signal to the optical transmission line, receive a monitoring signal in which a turnback monitoring signal and an other-device monitoring signal are mixed, the turnback monitoring signal being the own-device monitoring signal turned back through control by the relay, the other-device monitoring signal having a pulse width and an amplitude different from a pulse width and an amplitude of the own-device monitoring signal and being transmitted from an optical transmission line monitoring device facing the optical transmission line monitoring device, identify the turnback monitoring signal and the other-device monitoring signal included in the monitoring signal by using identification criteria for identifying the turnback monitoring signal and the other-device monitoring signal from the monitoring signal, and output an identification result for the turnback monitoring signal and the other-device monitoring signal.

Supplementary Note 2

The optical transmission line monitoring device according to supplementary note 1, wherein the processor is configured to execute the computer program to individually display a waveform of the turnback monitoring signal and a waveform of the other-device monitoring signal, indicated by the identification result, on a display screen.

Supplementary Note 3

The optical transmission line monitoring device according to supplementary note 1, wherein the processor is configured to execute the computer program to generate or update the identification criteria indicating a result of learning a relationship among a waveform of the monitoring signal, a specification of each of the own-device monitoring signal and the other-device monitoring signal, and the identification result.

Supplementary Note 4

The optical transmission line monitoring device according to supplementary note 3, wherein the processor is configured to execute the computer program to generate or update the identification criteria indicating a result of learning a relationship among a distance between two optical transmission line monitoring devices, a distance between the relay and each of the two optical transmission line monitoring devices, and the identification result.

Supplementary Note 5

The optical transmission line monitoring device according to supplementary note 1, wherein the identification criteria indicates, on a time axis, a relationship between the identification result and any one of the following states: a state where the turnback monitoring signal and the other-device monitoring signal are not in contact and do not overlap, a state where the turnback monitoring signal and the other-device monitoring signal are in contact without overlapping, a state where one of the turnback monitoring signal or the other-device monitoring signal overlaps in such a way as to include the other, and a state where the turnback monitoring signal and the other-device monitoring signal partially overlap.

Supplementary Note 6

The optical transmission line monitoring device according to supplementary note 1, wherein the processor is configured to execute the computer program to diagnose a state of each of the relay and the optical transmission line by using the identification result and diagnosis criteria for diagnosing the state of each of the relay and the optical transmission line from the turnback monitoring signal and the other-device monitoring signal each indicated by the identification result, and output a diagnosis result for the state of each of the relay and the optical transmission line.

Supplementary Note 7

The optical transmission line monitoring device according to supplementary note 6, wherein the processor is configured to execute the computer program to generate or update the diagnosis criteria indicating a result of learning a relationship among the identification result, a specification of each of the own-device monitoring signal and the other-device monitoring signal, and the state of each of the relay and the optical transmission line.

Supplementary Note 8

An optical transmission line monitoring method including steps performed by one of two optical transmission line monitoring devices facing each other and connected by an optical transmission line relayed by a relay, the steps being:

transmitting an own-device monitoring signal to the optical transmission line;

receiving a monitoring signal in which a turnback monitoring signal and an other-device monitoring signal are mixed, the turnback monitoring signal being the own-device monitoring signal turned back through control by the relay, the other-device monitoring signal having a pulse width and an amplitude different from a pulse width and an amplitude of the own-device monitoring signal and being transmitted from an optical transmission line monitoring device facing the optical transmission line monitoring device;

identifying the turnback monitoring signal and the other-device monitoring signal included in the monitoring signal by using identification criteria for identifying the turnback monitoring signal and the other-device monitoring signal from the monitoring signal; and outputting an identification result for the turnback monitoring signal and the other-device monitoring signal.

Supplementary Note 9

The optical transmission line monitoring method according to supplementary note 8, further including individually displaying a waveform of the turnback monitoring signal and a waveform of the other-device monitoring signal, indicated by the identification result, on a display screen.

Supplementary Note 10

The optical transmission line monitoring method according to supplementary note 8, further including generating or updating the identification criteria indicating a result of learning a relationship among a waveform of the monitoring signal, a specification of each of the own-device monitoring signal and the other-device monitoring signal, and the identification result.

Supplementary Note 11

The optical transmission line monitoring method according to supplementary note 10, further including generating or updating the identification criteria indicating a result of learning a relationship among a distance between two optical transmission line monitoring devices, a distance between the relay and each of the two optical transmission line monitoring devices, and the identification result.

Supplementary Note 12

The optical transmission line monitoring method according to supplementary note 8, wherein the identification criteria indicates, on a time axis, a relationship between the identification result and any one of the following states: a state where the turnback monitoring signal and the other-device monitoring signal are not in contact and do not overlap, a state where the turnback monitoring signal and the other-device monitoring signal are in contact without overlapping, a state where one of the turnback monitoring signal or the other-device monitoring signal overlaps in such a way as to include the other, and a state where the turnback monitoring signal and the other-device monitoring signal partially overlap.

Supplementary Note 13

The optical transmission line monitoring method according to supplementary note 8, further including diagnosing a state of each of the relay and the optical transmission line by using the identification result and diagnosis criteria for diagnosing the state of each of the relay and the optical transmission line from the turnback monitoring signal and the other-device monitoring signal each indicated by the identification result, and outputting a diagnosis result for the state of each of the relay and the optical transmission line.

Supplementary Note 14

The optical transmission line monitoring method according to supplementary note 13, further including generating or updating the diagnosis criteria indicating a result of learning a relationship among the identification result, a specification of each of the own-device monitoring signal and the other-device monitoring signal, and the state of each of the relay and the optical transmission line.

Supplementary Note 15

A non-transitory computer-readable recording medium storing an optical transmission line monitoring program for causing one of two optical transmission line monitoring devices, facing each other and connected by an optical transmission line relayed by a relay, to execute a transmission process to transmit an own-device monitoring signal to the optical transmission line, a reception process to receive a monitoring signal in which a turnback monitoring signal and an other-device monitoring signal are mixed, the turnback monitoring signal being the own-device monitoring signal turned back through control by the relay, the other-device monitoring signal having a pulse width and an amplitude different from a pulse width and an amplitude of the own-device monitoring signal and being transmitted from an optical transmission line monitoring device facing the optical transmission line monitoring device, an identification process to identify the turnback monitoring signal and the other-device monitoring signal included in the monitoring signal by using identification criteria for identifying the turnback monitoring signal and the other-device monitoring signal from the monitoring signal, and an output process to output an identification result for the turnback monitoring signal and the other-device monitoring signal.

Supplementary Note 16

A non-transitory computer-readable recording medium storing the optical transmission line monitoring program according to supplementary note 15, wherein the output process individually displays a waveform of the turnback monitoring signal and a waveform of the other-device monitoring signal, indicated by the identification result, on a display screen.

Supplementary Note 17

A non-transitory computer-readable recording medium storing the optical transmission line monitoring program according to supplementary note 15, wherein the optical transmission line monitoring device is caused to further execute an identification criteria learning process to generate or update the identification criteria indicating a result of learning a relationship among a waveform of the monitoring signal, a specification of each of the own-device monitoring signal and the other-device monitoring signal, and the identification result.

Supplementary Note 18

A non-transitory computer-readable recording medium storing the optical transmission line monitoring program according to supplementary note 17, wherein the identification criteria learning process generates or updates the identification criteria indicating a result of learning a relationship among a distance between two optical transmission line monitoring devices, a distance between the relay and each of the two optical transmission line monitoring devices, and the identification result.

Supplementary Note 19

A non-transitory computer-readable recording medium storing the optical transmission line monitoring program according to supplementary note 15, wherein the identification criteria indicates, on a time axis, a relationship between the identification result and any one of the following states: a state where the turnback monitoring signal and the other-device monitoring signal are not in contact and do not overlap, a state where the turnback monitoring signal and the other-device monitoring signal are in contact without overlapping, a state where one of the turnback monitoring signal or the other-device monitoring signal overlaps in such a way as to include the other, and a state where the turnback monitoring signal and the other-device monitoring signal partially overlap.

Supplementary Note 20

A non-transitory computer-readable recording medium storing the optical transmission line monitoring program according to supplementary note 15, wherein the optical transmission line monitoring device is caused to further execute a diagnosis process to diagnose a state of each of the relay and the optical transmission line by using the identification result and diagnosis criteria for diagnosing the state of each of the relay and the optical transmission line from the turnback monitoring signal and the other-device monitoring signal each indicated by the identification result, and the output process outputs a diagnosis result for the state of each of the relay and the optical transmission line.

Supplementary Note 21

A non-transitory computer-readable recording medium storing the optical transmission line monitoring program according to supplementary note 20, wherein the optical transmission line monitoring device is caused to further execute a diagnosis criteria learning process to generate or update the diagnosis criteria indicating a result of learning a relationship among the identification result, a specification of each of the own-device monitoring signal and the other-device monitoring signal, and the state of each of the relay and the optical transmission line.

The invention claimed is:

1. An optical transmission line monitoring device connected by an optical transmission line via a relay to a second optical transmission line monitoring device, the optical transmission line monitoring device comprising:

at least one memory storing a computer program; and at least one processor configured to execute the computer program to:

transmit an own-device monitoring signal to the optical transmission line, receive a monitoring signal in which a turnback monitoring signal and an other-device monitoring signal are mixed, the turnback monitoring signal being the own-device monitoring signal turned back through the relay, the other-device monitoring signal having a pulse width and an amplitude different from a pulse width and an amplitude of the own-device monitoring signal and being transmitted from the second optical transmission line monitoring device, identify the turnback monitoring signal and the other-device monitoring signal included in the monitoring signal by using identification criteria for identifying the turnback monitoring signal and the other-device monitoring signal from the monitoring signal, and output an identification result for the turnback monitoring signal and the other-device monitoring signal.

2. The optical transmission line monitoring device according to claim 1, wherein the processor is configured to execute the computer program to individually display a waveform of the turnback monitoring signal and a waveform of the other-device monitoring signal, indicated by the identification result, on a display screen.

3. The optical transmission line monitoring device according to claim 1, wherein the processor is configured to execute the computer program to generate or update the identification criteria indicating a result of learning a relationship among a waveform of the monitoring signal, a specification of each of the own-device monitoring signal and the other-device monitoring signal, and the identification result.

4. The optical transmission line monitoring device according to claim 3, wherein the processor is configured to execute the computer program to generate or update the identification criteria indicating a result of learning a relationship among a distance between the optical transmission line monitoring device and the second optical transmission line monitoring device, distances between the relay and the optical transmission line monitoring device and the second optical transmission line monitoring device, respectively, and the identification result.

5. The optical transmission line monitoring device according to claim 1, wherein the identification criteria indicates, on a time axis, a relationship between the identification result and any one of the following states: a state where the turnback monitoring signal and the other-device monitoring signal are not in contact and do not overlap, a state where the turnback monitoring signal and the other-device monitoring signal are in contact without overlapping, a state where one of the turnback monitoring signal or the other-device monitoring signal overlaps in such a way as to include the other, and a state where the turnback monitoring signal and the other-device monitoring signal partially overlap.

6. The optical transmission line monitoring device according to claim 1, wherein the processor is configured to execute the computer program to diagnose a state of each of the relay and the optical transmission line by using the identification result and diagnosis criteria for diagnosing the state of each of the relay and the optical transmission line from the turnback monitoring signal and the other-device monitoring signal each indicated by the identification result, and output a diagnosis result for the state of each of the relay and the optical transmission line.

7. The optical transmission line monitoring device according to claim 6, wherein the processor is configured to execute the computer program to generate or update the diagnosis criteria indicating a result of learning a relationship among the identification result, a specification of each of the own-device monitoring signal and the other-device monitoring signal, and the state of each of the relay and the optical transmission line.

8. An optical transmission line monitoring method comprising steps performed by an optical transmission line monitoring device connected by an optical transmission line via a relay to a second optical transmission line monitoring device, the steps being:

transmitting an own-device monitoring signal to the optical transmission line;

receiving a monitoring signal in which a turnback monitoring signal and an other-device monitoring signal are mixed, the turnback monitoring signal being the own-device monitoring signal turned back through control by the relay, the other-device monitoring signal having a pulse width and an amplitude different from a pulse width and an amplitude of the own-device monitoring signal and being transmitted from the second optical transmission line monitoring device;

identifying the turnback monitoring signal and the other-device monitoring signal included in the monitoring signal by using identification criteria for identifying the turnback monitoring signal and the other-device monitoring signal from the monitoring signal; and outputting an identification result for the turnback monitoring signal and the other-device monitoring signal.

9. The optical transmission line monitoring method according to claim 8, further comprising individually displaying a waveform of the turnback monitoring signal and a waveform of the other-device monitoring signal, indicated by the identification result, on a display screen.

10. The optical transmission line monitoring method according to claim 8, further comprising generating or updating the identification criteria indicating a result of learning a relationship among a waveform of the monitoring signal, a specification of each of the own-device monitoring signal and the other-device monitoring signal, and the identification result.

11. The optical transmission line monitoring method according to claim 10, further comprising generating or updating the identification criteria indicating a result of learning a relationship among a distance between the optical transmission line monitoring device and the second optical transmission line monitoring device, distances between the relay and the optical transmission line monitoring device and the second optical transmission line monitoring device, respectively, and the identification result.

12. The optical transmission line monitoring method according to claim 8, wherein the identification criteria indicates, on a time axis, a relationship between the identification result and any one of the following states: a state where the turnback monitoring signal and the other-device monitoring signal are not in contact and do not overlap, a state where the turnback monitoring signal and the other-device monitoring signal are in contact without overlapping, a state where one of the turnback monitoring signal or the other-device monitoring signal overlaps in such a way as to include the other, and a state where the turnback monitoring signal and the other-device monitoring signal partially overlap.

13. The optical transmission line monitoring method according to claim 8, further comprising diagnosing a state of each of the relay and the optical transmission line by using the identification result and diagnosis criteria for diagnosing the state of each of the relay and the optical transmission line from the turnback monitoring signal and the other-device monitoring signal each indicated by the identification result, and outputting a diagnosis result for the state of each of the relay and the optical transmission line.

14. The optical transmission line monitoring method according to claim 13, further comprising generating or updating the diagnosis criteria indicating a result of learning a relationship among the identification result, a specification of each of the own-device monitoring signal and the other-device monitoring signal, and the state of each of the relay and the optical transmission line.

15. A non-transitory computer-readable recording medium storing an optical transmission line monitoring program for causing an optical transmission line monitoring device connected by an optical transmission line via a relay to a second optical transmission line monitoring device, to execute;

a transmission process to transmit an own-device monitoring signal to the optical transmission line, a reception process to receive a monitoring signal in which a turnback monitoring signal and an other-device monitoring signal are mixed, the turnback monitoring signal being the own-device monitoring signal turned back through the relay, the other-device monitoring signal having a pulse width and an amplitude different from a pulse width and an amplitude of the own-device monitoring signal and being transmitted from the second optical transmission line monitoring device, an identification process to identify the turnback monitoring signal and the other-device monitoring signal included in the monitoring signal by using identification criteria for identifying the turnback monitoring signal and the other-device monitoring signal from the monitoring signal, and an output process to output an identification result for the turnback monitoring signal and the other-device monitoring signal.

16. A non-transitory computer-readable recording medium storing the optical transmission line monitoring program according to claim 15, wherein the output process individually displays a waveform of the turnback monitoring signal and a waveform of the other-device monitoring signal, indicated by the identification result, on a display screen.

17. A non-transitory computer-readable recording medium storing the optical transmission line monitoring program according to claim 15, wherein the optical transmission line monitoring device is caused to further execute an identification criteria learning process to generate or update the identification criteria indicating a result of learning a relationship among a waveform of the monitoring signal, a specification of each of the own-device monitoring signal and the other-device monitoring signal, and the identification result.

18. A non-transitory computer-readable recording medium storing the optical transmission line monitoring program according to claim 17, wherein the identification criteria learning process generates or updates the identification criteria indicating a result of learning a relationship among a distance between the optical transmission line monitoring device and the second optical transmission line monitoring device, distances between the relay and the optical transmission line monitoring device and the second optical transmission line monitoring device, respectively, and the identification result.

19. A non-transitory computer-readable recording medium storing the optical transmission line monitoring program according to claim 15, wherein the identification criteria indicates, on a time axis, a relationship between the identification result and any one of the following states: a state where the turnback monitoring signal and the other-device monitoring signal are not in contact and do not overlap, a state where the turnback monitoring signal and the other-device monitoring signal are in contact without overlapping, a state where one of the turnback monitoring signal or the other-device monitoring signal overlaps in such a way as to include the other, and a state where the turnback monitoring signal and the other-device monitoring signal partially overlap.

20. A non-transitory computer-readable recording medium storing the optical transmission line monitoring program according to claim 15, wherein the optical transmission line monitoring device is caused to further execute a diagnosis process to diagnose a state of each of the relay and the optical transmission line by using the identification result and diagnosis criteria for diagnosing the state of each of the relay and the optical transmission line from the turnback monitoring signal and the other-device monitoring signal each indicated by the identification result, and the output process outputs a diagnosis result for the state of each of the relay and the optical transmission line.

* * * * *